United States Patent
McCartney

(10) Patent No.: US 10,259,263 B2
(45) Date of Patent: Apr. 16, 2019

(54) DUAL WHEEL SWIVEL CASTER WITH A TORQUE LIMITER AND ASSOCIATED METHOD

(71) Applicant: Hamilton Caster & Manufacturing Company, Hamilton, OH (US)

(72) Inventor: Patrick L. McCartney, Fairfield, OH (US)

(73) Assignee: Hamilton Caster & Manufacturing Company, Hamilton, OH (US)

( * ) Notice: Subject to any disclaimer, the term of this patent is extended or adjusted under 35 U.S.C. 154(b) by 77 days.

(21) Appl. No.: 15/699,280

(22) Filed: Sep. 8, 2017

(65) Prior Publication Data

US 2019/0077192 A1 Mar. 14, 2019

(51) Int. Cl.
*B60B 33/00* (2006.01)

(52) U.S. Cl.
CPC ...... *B60B 33/0049* (2013.01); *B60B 33/0042* (2013.01); *B60B 33/0057* (2013.01); *B60B 33/0071* (2013.01); *B60B 2380/14* (2013.01); *B60B 2900/212* (2013.01); *B60B 2900/321* (2013.01); *B62B 2301/04* (2013.01)

(58) Field of Classification Search
CPC ............ B60B 33/0049; B60B 33/0071; B60B 33/0057; B60B 33/0042; B60B 2900/321; B60B 2900/212; B60B 2380/14; B62B 2301/04
See application file for complete search history.

(56) References Cited

U.S. PATENT DOCUMENTS

| | | | |
|---|---|---|---|
| 2,459,347 A * | 1/1949 | Tolman | B60B 11/06 301/36.2 |
| 2,602,612 A * | 7/1952 | Zimmerman | B64C 25/505 16/35 D |
| 2,620,235 A | 12/1952 | Butler | |
| 2,727,582 A | 12/1955 | Lisenby | |
| 5,406,675 A | 4/1995 | White | |
| 6,471,301 B1 | 10/2002 | Johnson | |
| 6,880,203 B1 * | 4/2005 | Aubin | B60B 33/0028 16/31 R |
| 8,863,355 B1 * | 10/2014 | Lee | B60B 33/0042 16/46 |
| 2009/0146388 A1 * | 6/2009 | Rauch, Jr. | B60B 3/001 280/81.6 |

* cited by examiner

*Primary Examiner* — Drew J Brown
(74) *Attorney, Agent, or Firm* — Wood, Herron & Evans, LLP

(57) ABSTRACT

A dual wheel swivel caster includes a swivel assembly, a horn, a rig hub, a solid axle, at least one ring of roller bearings, first and second wheel assemblies, and at least one ring of bearings. The first wheel assembly has a first wheel axis, and includes an annular plate element. The torque limiter is configured to rotatably couple the first and second wheel assemblies with the solid axle when the torque between the annular plate element and the torque limiter is below a preset value. The torque limiter is configured to rotatably decouple the first wheel assembly from the solid axle and the second wheel assembly when the torque exceeds the preset value. The ring of bearings is configured to allow the first wheel assembly to rotate independently of the solid axle and the second wheel assembly about the rotational axis when the torque exceeds the preset value.

19 Claims, 7 Drawing Sheets

DUAL WHEEL SWIVEL CASTER WITH A TORQUE LIMITER AND ASSOCIATED METHOD

TECHNICAL FIELD

The present invention relates generally to casters, and more particularly, to dual wheel swivel casters.

BACKGROUND

Casters are commonly mounted to transport vehicles, such as carts, trailers, trucks, or dollies, and allow for rolling movement of the transport vehicle along a ground surface. A caster may have a single wheel or multiple wheels, such as a dual wheel caster that includes first and second wheels. Dual wheel casters may be designed to rotate (or "swivel") about a vertical axis (known as "swivel" casters), or may be fixed (known as "rigid" casters).

For conventional dual wheel swivel casters, the first and second wheels are mounted with the axle, such that the horizontal wheel axis is offset laterally from the vertical swivel axis. In other words, the first and second wheels are mounted such that the vertical swivel axis does not pass through the horizontal axis. During vehicle movement, this offset enables the first and second wheels to change direction to position themselves behind (or "trail") the swivel axis, thereby maintaining proper self-alignment with the direction of travel of the transport vehicle.

Conventional dual wheel swivel casters enable the first and second wheels to change direction while rolling, thereby allowing an operator to turn or otherwise steer the vehicle. Conventional dual wheel swivel casters may have the first and second wheels rotatably coupled (known as being "locked together") at all times, or may have the first and second wheels independently rotatable, allowing for relative rotation between the first and second wheels. There are benefits and drawbacks to both arrangements. For example, having the first and second wheels independently rotatable may cause wobbling (known as "shimmying") that may be especially noticeable when the transport vehicle is traveling at a high rate of speed and/or is lightly loaded or empty. Having the first and second wheels locked together prevents this problem, but may cause another problem when the transport vehicle desires to turn or backup.

For example, having the first and second wheels locked together may result in "scrubbing." When the transport vehicle reverses its direction of travel, the first and second wheels must swivel a full 180 degrees through their respective arcs to a new trailing position to realign with the new direction of travel of the transport vehicle. As the first and second wheel assemblies 44, 46 swivel about vertical axis A, the first and second wheel assemblies 44, 46 will be naturally inclined to rotate at differing speeds and direction from one another. The first and second wheel assemblies 44, 46 being rotationally locked together prevents this difference in speed and rotation thus preventing caster "shimmy" while moving on a linear path. The first and second wheel assemblies 44, 46 being locked together also causes scrubbing, where one or both of the wheels frictionally drag across (or "scrub") the ground surface, such as a concrete or asphalt floor for example, thereby requiring an increase in force applied by the operator to the vehicle in order to complete the vehicle turn. This scrubbing undesirably increases stress on the swivel bearing components and the tread of the first and second wheels, and accelerates their wear.

What is needed is a dual wheel swivel caster where the first and second wheels are locked together in a first configuration and are independently rotatable in a second configuration, thereby capturing the benefits, while eliminating the problems, of both arrangements. Accordingly, there remains a need for improvements to dual wheel swivel casters to address the shortcomings described above.

SUMMARY

A dual wheel swivel caster according to an exemplary embodiment of the invention includes a swivel assembly, a horn, a rig hub, a solid axle, at least one ring of roller bearings, a first wheel assembly, a second wheel assembly, and at least one ring of bearings. The swivel assembly includes a swivel plate configured to be mounted to a vehicle. The horn extends from the swivel assembly. The rig hub is rotatably coupled with the horn. The rig hub includes a cavity extending therethrough. The solid axle extends through the cavity and includes first and second end portions. The ring of roller bearings is disposed within the cavity and is configured to allow the solid axle to rotate relative to the rig hub about a rotational axis. The first wheel assembly has a first wheel axis, and includes an annular plate element that is parallel to and offset from the first wheel axis. The second wheel assembly is rotatably coupled with the solid axle and is configured to rotate about the rotational axis. The torque limiter is configured to rotatably couple the first and second wheel assemblies with the solid axle when the torque between the annular plate element and the torque limiter is below a preset value. The torque limiter is configured to rotatably decouple the first wheel assembly from the solid axle and the second wheel assembly when the torque exceeds the preset value. The ring of bearings is disposed adjacent a first end portion of the solid axle, and is configured to allow the first wheel assembly to rotate independently of the solid axle and the second wheel assembly about the rotational axis when the torque exceeds the preset value.

A transport vehicle that is configured to move along a ground surface according to an exemplary embodiment of the invention includes at least one dual wheel swivel caster. The dual wheel swivel caster includes a swivel assembly, a horn, a rig hub, a solid axle, at least one ring of roller bearings, a first wheel assembly, a second wheel assembly, and at least one ring of bearings similar to those described above.

A method of preventing a dual wheel swivel caster from scrubbing a ground surface according to another aspect of the invention is also described. The method includes providing a dual wheel swivel caster that includes a swivel assembly, a horn, a rig hub, a solid axle, at least one ring of roller bearings, a first wheel assembly, a second wheel assembly, a torque limiter and at least one ring of bearings. The method includes rotatably coupling the first and second wheel assemblies with the solid axle when the torque between the annular plate element and the torque limiter is below a preset value. The method also includes subsequently rotatably decoupling the first wheel assembly from the solid axle and the second wheel assembly when the torque exceeds the preset value. At least one ring of bearings is disposed adjacent a first end portion of the solid axle and allows the first wheel assembly to rotate independently of the solid axle and the second wheel assembly about the rotational axis. The method also includes subsequently rotatably coupling the first and second wheel assemblies with the solid axle when the torque between the annular plate element and the torque limiter is below the preset value.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
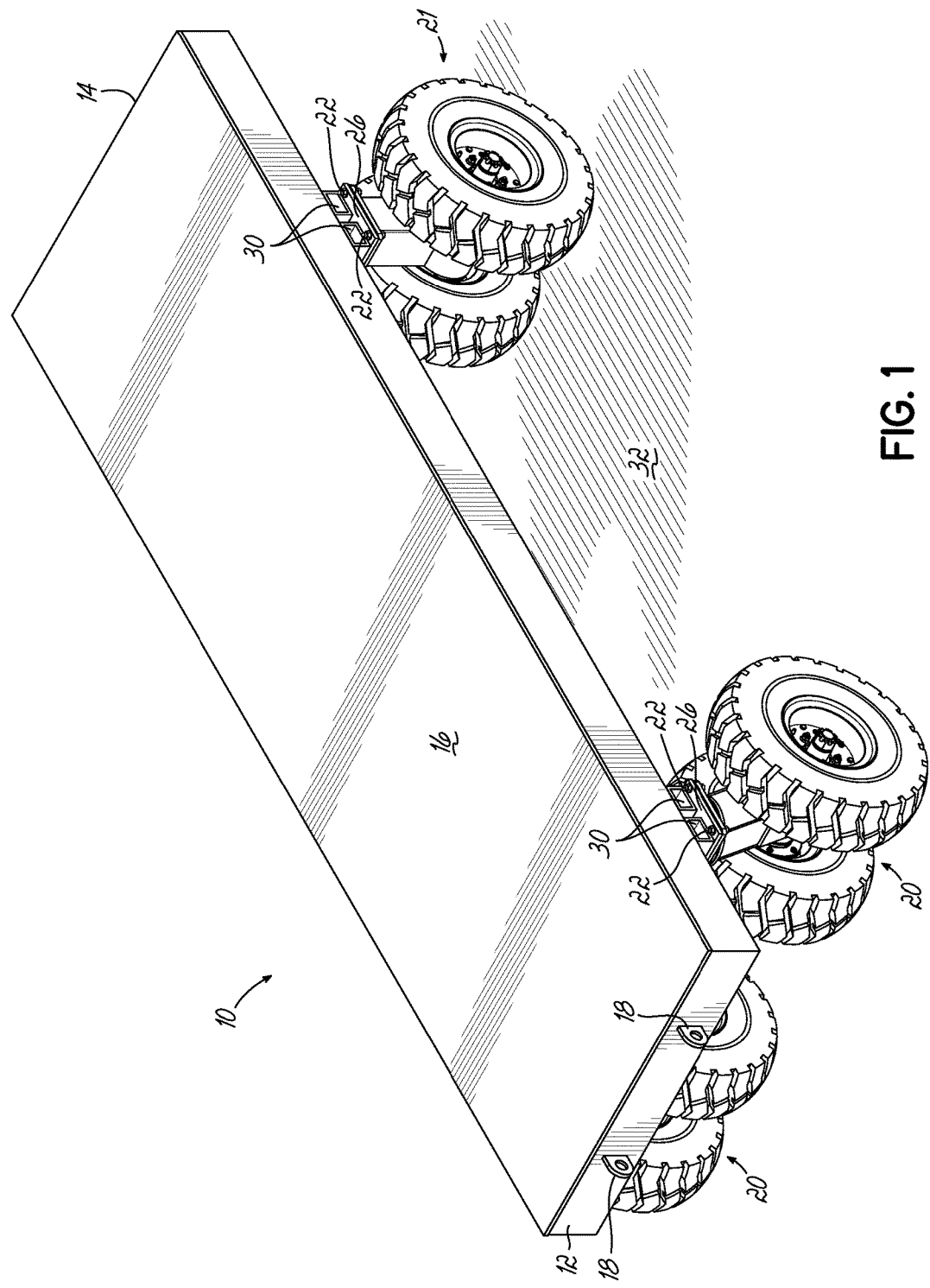
FIG. 1 is a perspective view of an exemplary transport vehicle including dual wheel swivel casters and dual wheel rigid casters.

Exemplary embodiments of the present invention, and their features and advantages, may be understood by referring to the Figures, where like numerals are used for corresponding parts in the various drawings. Referring specifically to FIG. 1, an exemplary transport vehicle in the form of a platform trailer 10 is shown. The platform trailer 10 includes a front end 12, a rear end 14, a platform 16, and one or more attachment structures 18 configured to be attached to a towing vehicle (not shown) using a variety of attachment devices and methods. The platform trailer 10 is provided at its front end 12 with a pair of dual wheel swivel casters 20, and at its rear end 14 with a pair of dual wheel rigid casters 21 (with one dual wheel rigid caster being hidden from view).

While the transport vehicle is shown in the form of a platform trailer 10 having a particular arrangement of dual wheel swivel casters 20 and dual wheel rigid casters 21, it will be appreciated that the vehicle may take various alternative forms, such as a truck for example, and include various alternative arrangements of dual wheel swivel casters 20. Moreover, transport vehicles may be fitted with one or more dual wheel swivel casters and/or one or more rigid casters, depending on the application and vehicle design. While not shown, for improved vehicle maneuverability in tight spaces, the vehicle may be provided with dual wheel swivel casters 20 at both the front end 12 and the rear end 14 of the transport vehicle.

Figure 2:
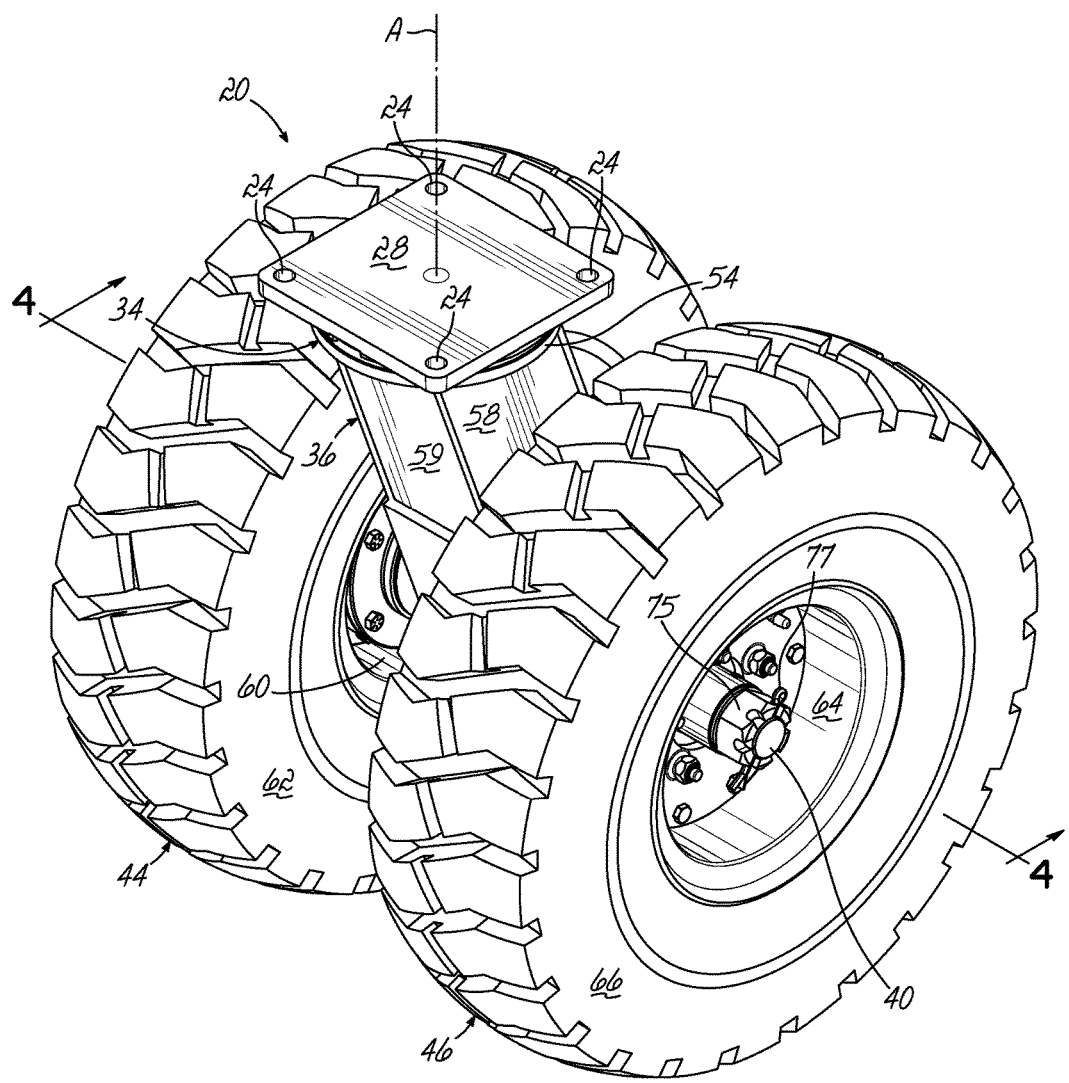
FIG. 2 is a top perspective view of a dual wheel swivel caster in accordance with an exemplary embodiment.
Figure 3:
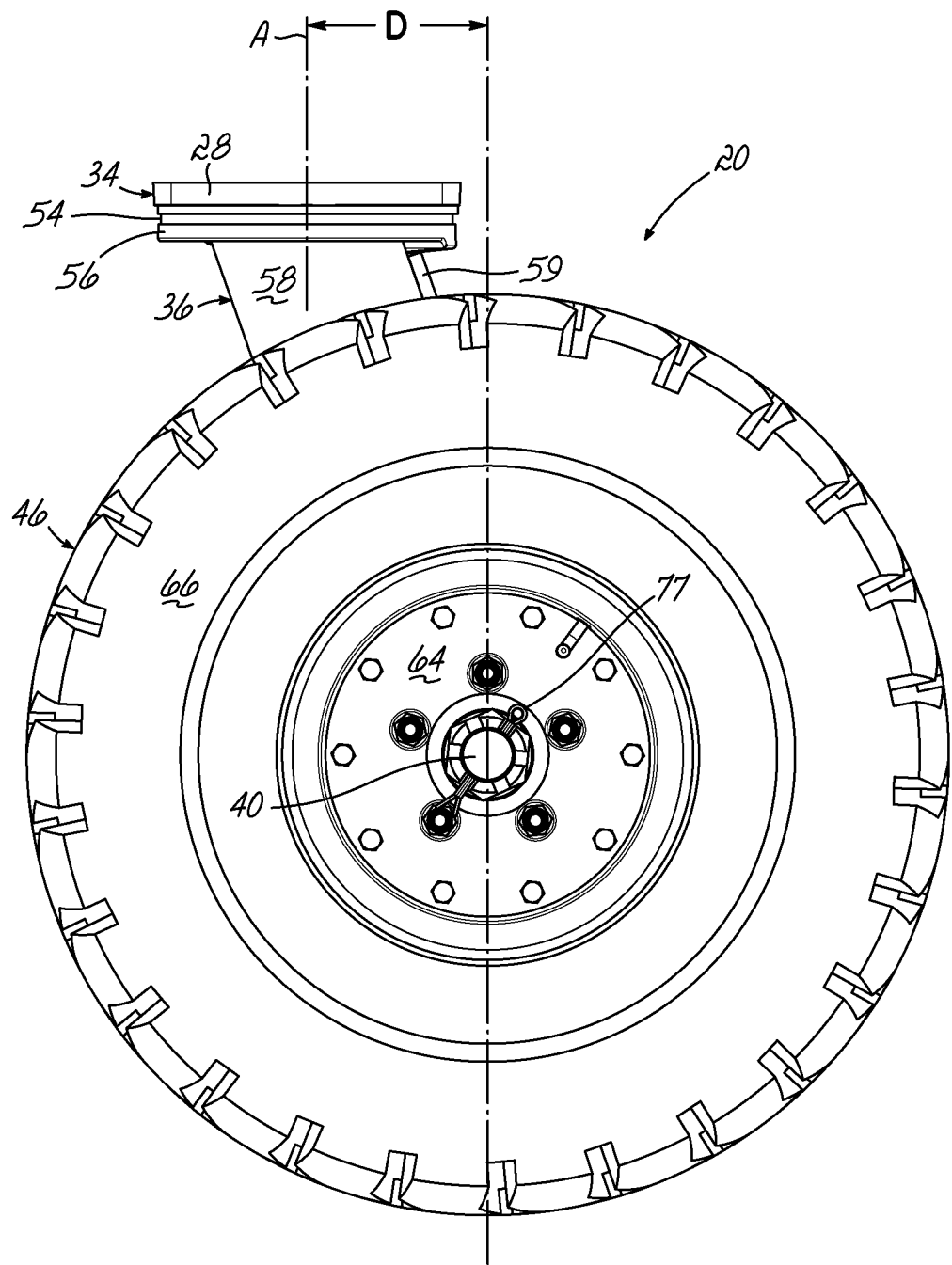
FIG. 3 is a side view of the dual wheel swivel caster of FIG. 2.

With continued reference to FIG. 1, the dual wheel swivel casters 20 and the dual wheel rigid casters 21 are coupled to the platform trailer 10 using threaded fasteners 22 that pass through mounting holes 24 in a mounting bracket 26 and mounting holes 24 in a swivel plate 28 (as will be described with respect to FIGS. 2 and 3 showing an exemplary dual wheel swivel caster 20). The platform 16 may be reinforced using one or more hollow bars 30 extending between two dual wheel swivel casters 20 or two dual wheel rigid casters 21. The platform 16 is configured to receive a load of one or more objects for transportation by the platform trailer 10 along a ground surface 32.

Referring now to FIGS. 2 and 3, a dual wheel swivel caster 20 according to an exemplary embodiment is shown. As will be described in greater detail below, the dual wheel swivel caster 20 generally includes a swivel assembly 34 defining a swivel axis ("A"), a horn 36 extending from the swivel assembly 34, a rig hub 38 (shown in FIGS. 4 and 5), a solid axle 40, at least one ring of roller bearings (with first and second rings 42a-b of roller bearings being shown in FIGS. 4 and 5), a first wheel assembly 44, a second wheel assembly 46, and at least one ring of bearings (with an inner ring 48 of tapered roller thrust bearings 50 and an outer ring 52 of tapered roller thrust bearings 50 being shown in FIGS. 4 and 5).

With continued reference to FIGS. 2 and 3, the swivel assembly 34 is arranged at an upper end of the dual wheel swivel caster 20, and includes a swivel plate 28 configured to be mounted to a transport vehicle using threaded fasteners 22 extending through mounting holes 24 (shown in FIG. 1). The swivel assembly 34 includes a swivel ring 54 rotatable relative to the swivel plate 28. The swivel assembly 34 also includes a plurality of spherical bearing balls (not shown) that enable the swivel ring 54 to rotate, or "swivel," relative to the swivel plate 28 about the swivel axis A. While not shown, the spherical bearing balls are retained in an annular ring formation by an inner bearing race coupled with or formed on the swivel plate 28, and an outer bearing race coupled with or formed on the swivel ring 54. It will be appreciated that the swivel assembly 34 may be a "kingpinless" type swivel assembly. Further, it will be appreciated that various other types of known rolling bearing elements may be used in alternative embodiments.

The horn 36 is coupled with and depends downwardly from the swivel ring 54. The horn 36 includes a base plate 56 and a pair of legs 58 extending downwardly from the base plate 56. The horn 36 may be reinforced with one or more reinforcing plates 59 that connect the pair of legs 58 together. The rig hub 38 is rotatably coupled with the horn 36. As used herein, "rotatably coupled" means that respective components are operatively connected with one another to prevent relative rotation, but need not be directedly connected together. As shown in FIGS. 2 and 3, the first wheel assembly 44 includes a first wheel rim 60 and a first wheel 62, and the second wheel assembly 46 includes a second wheel rim 64 and a second wheel 66.

Referring now to FIG. 3, when a transport vehicle to which the dual wheel swivel caster 20 is mounted reverses or otherwise changes its direction of travel, the dual wheel swivel caster 20 rotates. As shown, the solid axle 40 is offset in a generally horizontal direction from swivel axis A. In other words, the solid axle 40 "trails" the swivel axis A, such that a first plane passing through the rolling axis defined by the solid axle 40 and parallel to the swivel axis A is offset from a second, parallel plane passing through the swivel axis A. In the trailing position, the first and second wheels 62, 66 trail by a trailing distance ("D"), also known as "offset distance" or "lead distance", measured between the rolling axis of the solid axle 40 and the swivel axis A.

Unless the external force applied to the transport vehicle for initiating its change in direction is nearly perfectly aligned with the longitudinal axis of the transport vehicle, the first and second wheels 62, 66 will initially prefer to swivel rather than slide toward their new trailing position. For vehicle turns that deviate from the original direction of vehicle travel by more than 90 degrees (e.g., the 180-degree reversal in direction), swiveling to a new trailing position would disadvantageously result in one or both of the first and second wheels 62, 66 scrubbing the ground surface 32. Consequently, and advantageously, wheel scrub is substantially eliminated by decoupling the first and second wheels 62, 66 using a torque limiter 68, as will be described in greater detail below.

Figure 4:
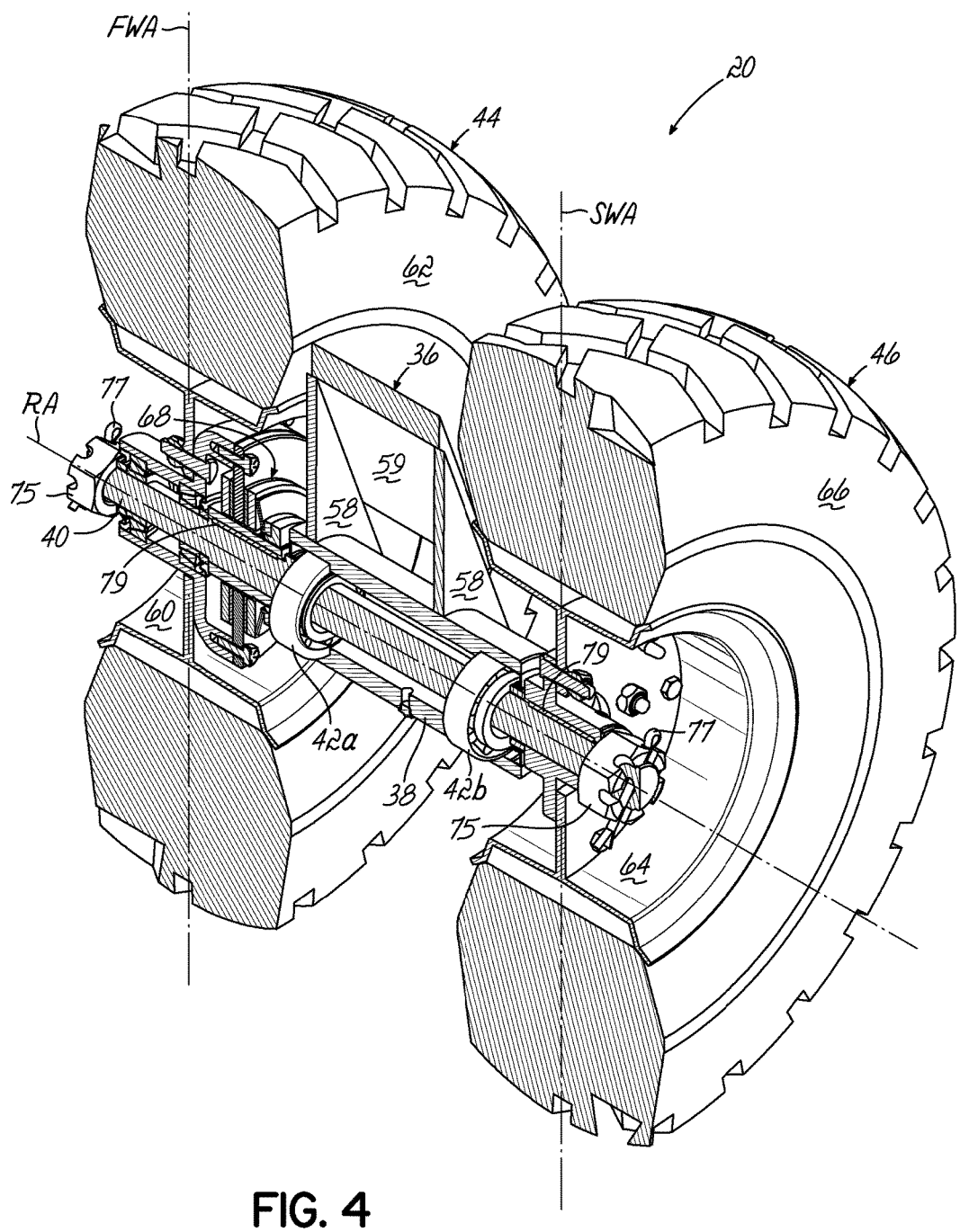
FIG. 4 is a cross-sectional perspective view of the dual wheel swivel caster of FIG. 2, taken across line 4-4.
Figure 5:
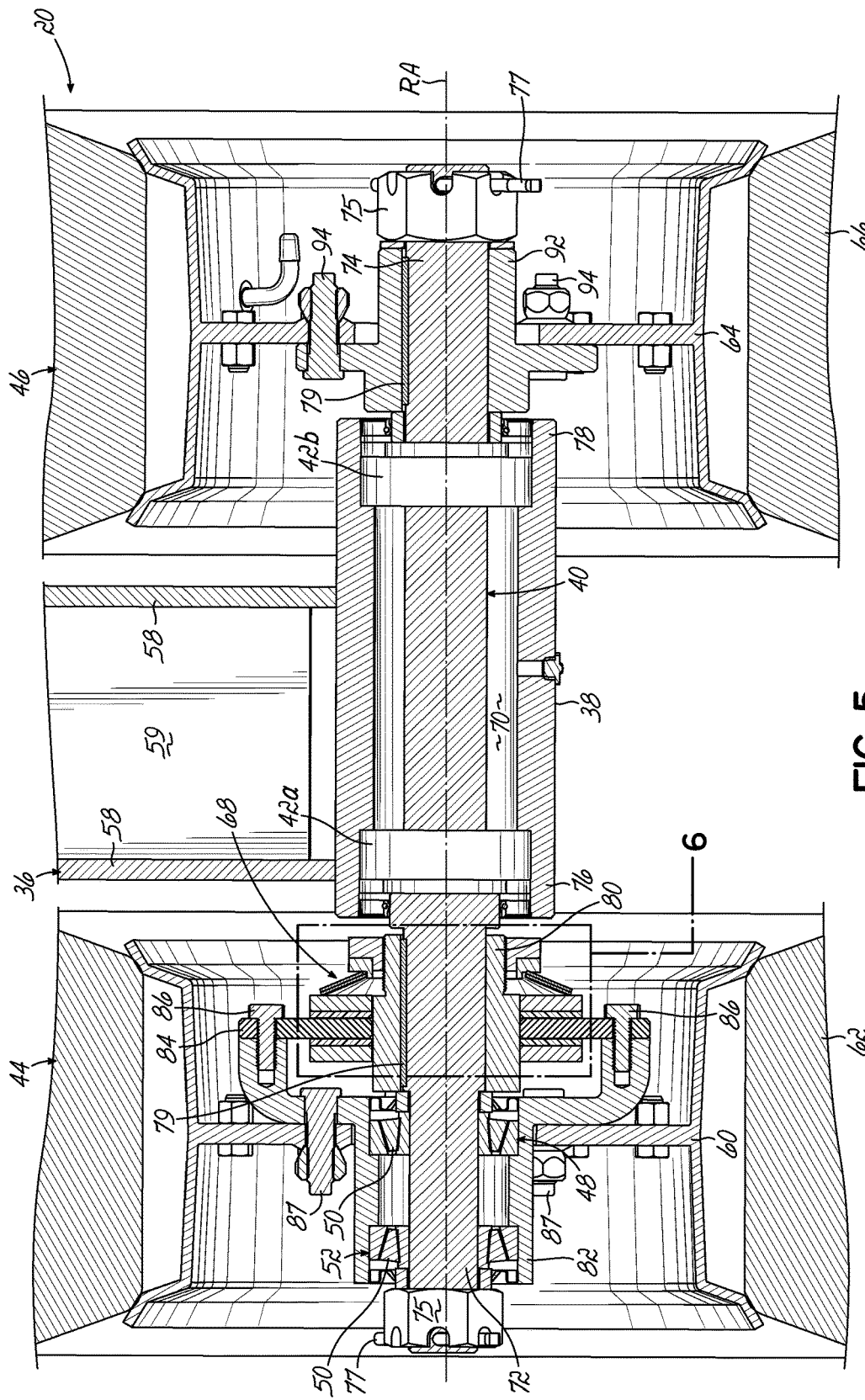
FIG. 5 is a cross-sectional view of a portion of the dual wheel swivel caster FIG. 4.

Now with reference to FIGS. 4 and 5 that show the internal components of an exemplary dual wheel swivel caster 20. The first wheel assembly 44 is rotatable about solid axle 40 through the torque limiter 68, once scrubbing/rotational forces exceed torque setting. The second wheel assembly 46 is fixed to solid axle 40 by using a key 79 (shown schematically) extending in a keyway, or any other suitable device to prevent the second wheel assembly 46 from rotating about solid axle 40, to enable rolling movement of the dual wheel swivel caster 20 in a direction in which the first and second wheel assemblies 44, 46 are aligned. As shown, the rig hub 38 includes a cavity 70 extending therethrough. The solid axle 40 includes first and second end portions 72, 74 that extend oppositely outside of the cavity 70. As shown in FIG. 5, the solid axle 40 extends between the first and second wheel assemblies 44, 46 and is integrally formed as a unitary piece. The solid axle 40 includes axle nuts 75 and pins 77 at the terminal ends of the first and second end portions 72, 74 of the solid axle 40.

At least one ring 42*a-b* of roller bearings is disposed within the cavity 70 and is configured to allow the solid axle 40 to rotate relative to the rig hub 38 about the rotational axis RA. As shown, the first and second rings 42*a-b* of roller bearings are completely disposed within the cavity 70 of the rig hub 38 and encircle parts of the solid axle 40. The first ring 42*a* of roller bearings is disposed adjacent a first end portion 76 of the rig hub 38, and the second ring 42*b* of roller bearings is disposed adjacent a second end portion 78 of the rig hub 38.

Figure 6:
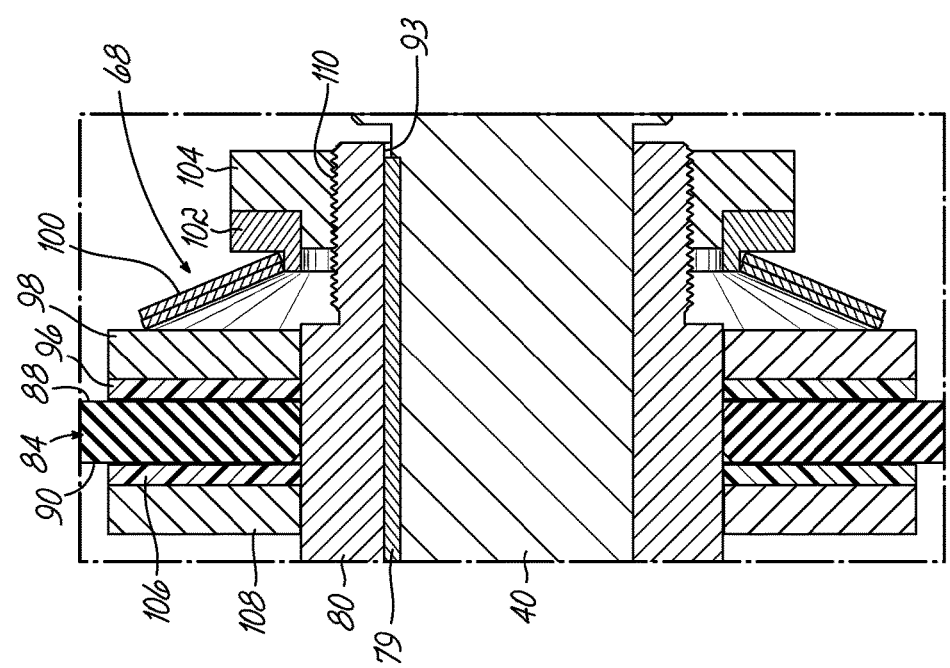
FIG. 6 is a detailed cross-sectional view of FIG. 5 showing details of the torque limiter.

With continued reference to FIGS. 4 and 5, the first wheel assembly 44 includes a first annular wheel hub 80 rotatably coupled with the solid axle 40, an annular bracket 82, an annular plate element 84, as well as the first wheel rim 60 and the first wheel 62 as previously described. The first annular wheel hub 80 is rotatably coupled with the solid axle 40 using a key 79, such that the two components are "keyed" together. FIG. 5 shows the key 79 schematically, while FIG. 6 shows the key 79 in a keyway 93. The annular bracket 82 is rotatably coupled to the annular plate element 84 using a plurality of fasteners, shown in the form of threaded fasteners 86. Similarly, the first wheel rim 60 is rotatably coupled with the annular bracket 82 using a plurality of fasteners, shown in the form of threaded fasteners 87. The first wheel 62 is rotatably coupled with the first wheel rim 60 and is configured to move along a ground surface 32. The first wheel assembly 44 has a first wheel axis ("FWA"), and includes an annular plate element 84 that is parallel to and offset from the first wheel axis FWA. The annular plate element 84 includes first and second sides 88, 90 (shown in FIG. 6) which are configured to contact the torque limiter 68, as will be described below. While the torque limiter 68 is shown and described with relation to the first wheel assembly 44, the torque limiter 68 may be positioned at other locations of the dual wheel swivel caster 20, such as the second wheel assembly 46.

The second wheel assembly 46 has a second wheel axis ("SWA") that is offset and parallel to the first wheel axis FWA. The second wheel assembly 46 is rotatably coupled with the solid axle 40 and is configured to rotate about the rotational axis RA. As previously described, the second wheel assembly 46 includes a second annular wheel hub 92 rotatably coupled with the solid axle 40 using a key 79, such that the two components are "keyed" together. The second wheel rim 64 is rotatably coupled with the second annular wheel hub 92 with a plurality of fasteners, shown in the form of threaded fasteners 94 extending through apertures 95 (shown in FIG. 7) of the second annular wheel hub 92. The second wheel 66 is rotatably coupled with the second wheel rim 64 and configured to move along the ground surface 32.

The torque limiter 68 will now be described in general reference to FIGS. 4 and 5, and with specific reference to the detailed cross-sectional view of FIG. 6. The torque limiter 68 rotatably couples the first and second wheel assemblies 44, 46 with the solid axle 40, by locking the first and second wheels 62, 66 together when the torque between the annular plate element 84 and the torque limiter 68 is below a preset value. Locking the first and second wheels 62, 66 together prevents wobbling (known as "shimmying") that may be especially noticeable when the transport vehicle is traveling at a high speed and/or is lightly loaded.

Conversely, the torque limiter 68 is configured to rotatably decouple the first wheel assembly 44 from the solid axle 40, which is rotatably coupled to the second wheel assembly 46, when the torque exceeds the preset value. This rotatably decouples the first wheel 62 from the second wheel 66 when the transport vehicle, to which the dual wheel swivel caster 20 is mounted, changes its direction of travel, and particularly when the transport vehicle generally reverses its direction of travel. This decoupling allows for relative rotation of the first and second wheels 62, 66, and prevents scrubbing of the ground surface 32. Moreover, one of the first and second wheels 62, 66 may counter-rotate. When the torque subsequently drops below the preset value, the first and second wheels 62, 66 automatically rotatably couple once again, until the torque between the annular plate element 84 and the torque limiter 68 exceeds the preset value, and so on.

With specific reference to FIG. 6, the torque limiter 68 includes a first annular friction disc 96 disposed adjacent to and parallel to the first side 88 of the annular plate element 84, a first annular pressure plate 98 configured to support the first annular friction disc 96, an annular disc spring 100 (shown in the form of a Belleville washer), an annular spring retainer 102 configured to secure the annular disc spring 100 in position, and an adjusting nut 104 configured to alter the preset torque. The annular plate element 84 is disposed closer to the first end portion 72 of the solid axle 40 than the annular disc spring 100. One suitable torque limiter 68 is a Model 500 or Model 700 Torque Limiter, commercially available from Great Lakes Industry Inc. of Jackson, Mich. However, a variety of different torque limiters 68, including different makes and models, are also suitable to provide a variety of different torque ratings depending on the application and/or the size of the dual wheel swivel caster 20.

The spring force imparted by the annular disc spring 100 is selectively adjustable by adjusting the adjusting nut 104 that is threadably coupled 110 with the first annular wheel hub 80. The adjusting nut 104 may also include an adjusting nut screw (not shown). Instead of an adjusting nut 104, an automatic adjustment method may be used to adjust the preset value based on the demands of the particular dual wheel swivel caster 20.

With continued reference to FIG. 6, the torque limiter 68 may also include a second annular friction disc 106 disposed adjacent to and parallel to the second side 90 of the annular plate element 84 and a second annular pressure plate 108 configured to support the second annular friction disc 106. With first and second annular friction discs 96, 106, the preset value is at least a function of the spring force of the annular disc spring 100 against the first annular pressure plate 98, a first frictional force between the first annular friction disc 96 against a first side 88 of the annular plate element 84, and a second frictional force between the second annular friction disc 106 against the second side 90 of the annular plate element 84.

When the torque is below the preset value, the first and second annular friction discs 96, 106 will not slip, or relatively rotate, against the annular plate element 84, resulting in the first and second wheels 62, 66 being locked together with no shimmying. However, the first and second annular friction discs 96, 106 will slip against the annular plate element 84 when opposing forces between the first and second annular friction discs 96, 106 and the annular plate element 84 exceed the holding ability of the torque limiter 68 based on the spring force by the annular spring disc varied through adjustment of the adjusting nut 104. The first and second annular friction discs 96, 106 are each formed of a material suitable to achieve an interface that generates sufficient friction during this relative sliding motion. In alternative embodiments, various materials having differing coefficients of friction may be used. It will be appreciated that the annular plate element 84, the first annular friction disc 96, and the second annular friction disc 106 may be formed of same material or of different materials.

The inner and outer rings 48, 52 of tapered roller thrust bearings 50 are configured to allow the first wheel assembly 44 to rotate independently of the solid axle 40 and the second wheel assembly 46 about the rotational axis RA when the torque exceeds the preset value. When the inner and outer rings 48, 52 of tapered roller thrust bearings 50 rotate, the annular bracket 82 is configured to rotate about the solid axle 40. Conversely, the tapered roller thrust bearings 50 of the inner and outer rings 48, 52 are configured not to rotate about the rotational axis RA when the torque between the annular plate element 84 and the torque limiter 68 is below the preset value.

Figure 7:
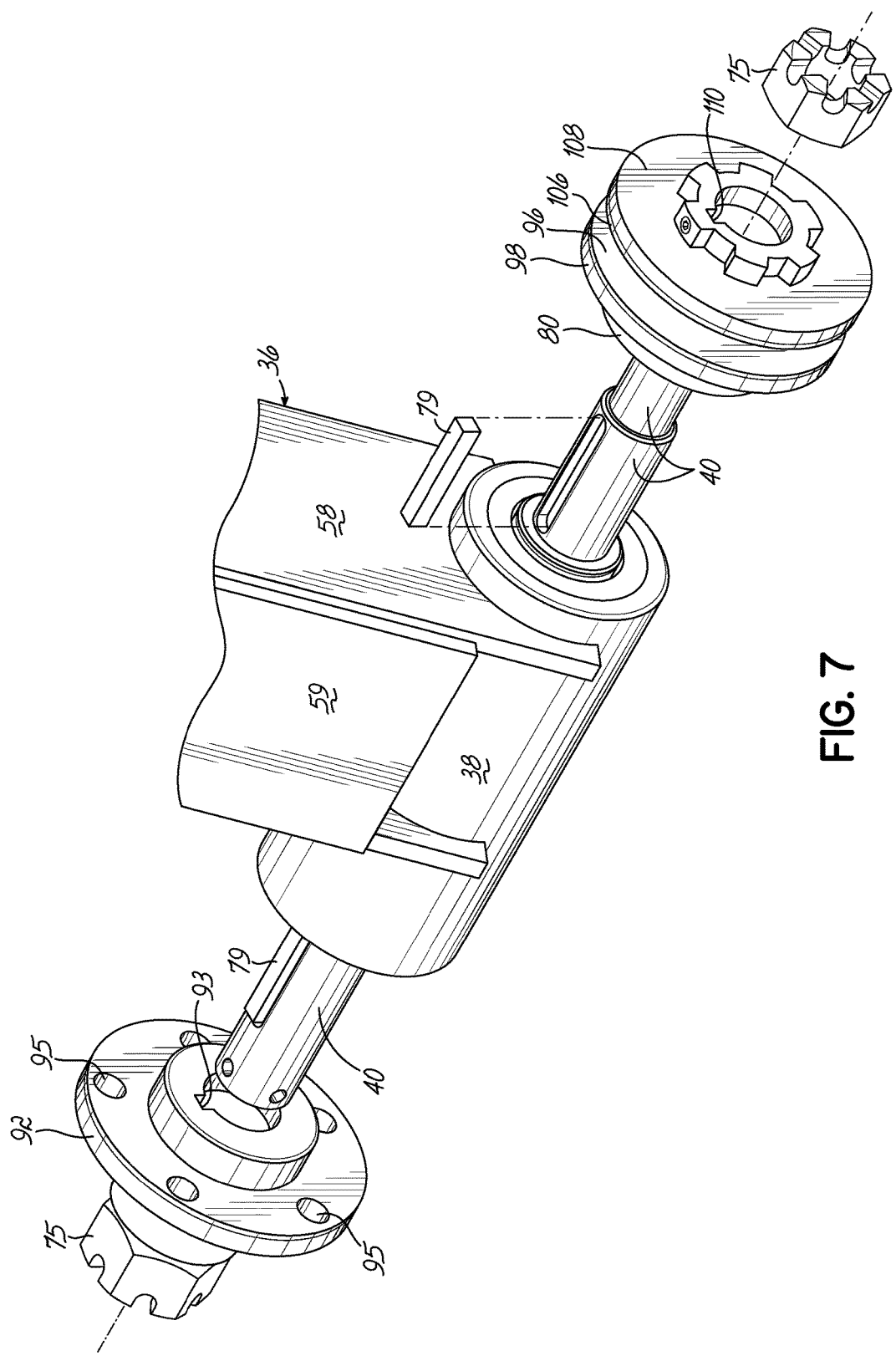
FIG. 7 is a partially exploded perspective view of the dual wheel swivel caster of FIG. 2 with certain components omitted.

FIG. 7 shows a partially exploded perspective view of a portion of the dual wheel swivel caster 20 with various components omitted for greater clarity. As shown, the horn 36 (with legs 58 and reinforcing plate 59) is operatively coupled to the rig hub 38. A key 79 is coupled to the solid axle 40 and is configured to prevent relative rotation between the solid axle 40 and the first annular wheel hub 80 containing a keyway 93. Another key 79 is coupled to the solid axle 40 and is configured to prevent relative rotation between the solid axle 40 and the second annular wheel hub 92 containing a keyway 110. While FIG. 7 shows the keys 79 as being separately formed from the solid axle 40, one or both of the keys 79 may be integrally formed as a unitary piece together with the solid axle 40. In the exemplary embodiment shown, the keyways 93, 110 are cutouts that have shapes corresponding with the keys 79, however, other shapes and arrangements of keys 79 and keyways 93, 110 are also envisioned. FIG. 7 additionally shows axle nuts 75, the first annular friction disc 96, the first annular pressure plate 98, the second annular friction disc 106, and the second annular pressure plate 108.

A method of preventing a dual wheel swivel caster 20 from scrubbing a ground surface 32 is also described. The method includes providing a dual wheel swivel caster 20 that includes a swivel assembly 34, a horn 36, a rig hub 38, a solid axle 40, at least one ring 42a-b of roller bearings, a first wheel assembly 44, a second wheel assembly 46, a torque limiter 68 and at least one ring of bearings, such as inner and outer rings 48, 52. The method includes rotatably coupling the first and second wheel assemblies 44, 46 with the solid axle 40 when the torque between the annular plate element 84 and the torque limiter 68 is below a preset value. The method also includes subsequently rotatably decoupling the first wheel assembly 44 from the solid axle 40 and the second wheel assembly 46 when the torque exceeds the preset value. The ring of bearings, such as inner and outer rings 48, 52, are disposed adjacent a first end portion 72 of the solid axle 40 to allow the first wheel assembly 44 to rotate independently of the solid axle 40 and the second wheel assembly 46 about the rotational axis RA. The method also includes subsequently rotatably coupling the first and second wheel assemblies 44, 46 with the solid axle 40 when the torque between the annular plate element 84 and the torque limiter 68 is below the preset value using the torque limiter 68.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:
1. A dual wheel swivel caster comprising:
a swivel assembly including a swivel plate configured to be mounted to a vehicle;
a horn extending from the swivel assembly;
a rig hub rotatably coupled with the horn, the rig hub including a cavity extending therethrough;
a solid axle extending through the cavity and including first and second end portions;
at least one ring of roller bearings disposed within the cavity, the at least one ring of roller bearings configured to allow the solid axle to rotate relative to the rig hub about a rotational axis;
a first wheel assembly having a first wheel axis, the first wheel assembly including an annular plate element that is parallel to and offset from the first wheel axis;
a second wheel assembly rotatably coupled with the solid axle and configured to rotate about the rotational axis;
a torque limiter configured to rotatably couple the first and second wheel assemblies with the solid axle when the torque between the annular plate element and the torque limiter is below a preset value, wherein the torque limiter is configured to rotatably decouple the first wheel assembly from the solid axle and the second wheel assembly when the torque exceeds the preset value; and at least one ring of bearings disposed adjacent a first end portion of the solid axle, the at least one ring of bearings configured to allow the first wheel assembly to rotate independently of the solid axle and the second wheel assembly about the rotational axis when the torque exceeds the preset value.

2. The dual wheel swivel caster of claim 1,
wherein the annular plate element includes first and second sides, and wherein the torque limiter further comprises:
a first annular friction disc disposed adjacent to and parallel to the first side the annular plate element;
a first annular pressure plate configured to support the first annular friction disc;
an annular disc spring; and
an annular spring retainer configured to secure the annular disc spring,
wherein the preset value is at least a function of a spring force of the annular disc spring against the first annular pressure plate and a frictional force between the first annular friction disc the first side the annular plate element.

3. The dual wheel swivel caster of claim 2, wherein the annular plate element is disposed closer to the first end portion of the solid axle than the annular disc spring.

4. The dual wheel swivel caster of claim 2, wherein the torque limiter further comprises:
a second annular friction disc disposed adjacent to and parallel to the second side of the annular plate element;
a second annular pressure plate configured to support the second annular friction disc,
wherein the preset value is at least a function of the spring force of the annular disc spring against the first annular pressure plate, a first frictional force between the first annular friction disc against the first side of the annular plate element, and a second frictional force between the second annular friction disc against the second side of the annular plate element.

5. The dual wheel swivel caster of claim 2,
wherein the first wheel assembly further comprises a first annular wheel hub rotatably coupled with the solid axle, and
wherein the spring force imparted by the annular disc spring is selectively adjustable by adjusting a torque adjustability mechanism threadably coupled with the first annular wheel hub.

6. The dual wheel swivel caster of claim 1, wherein the at least one ring of roller bearings further comprises:
a first ring of roller bearings disposed completely within the cavity of the rig hub and adjacent the first end portion of the rig hub, wherein the first ring of roller bearings encircles the solid axle; and
a second ring of roller bearings disposed completely within the cavity of the rig hub and adjacent a second end portion of the rig hub, wherein the second ring of roller bearings encircles the solid axle at a distance from the first ring of roller bearings.

7. The dual wheel swivel caster of claim 1, wherein the at least one ring of bearings further comprise:
inner and outer rings of tapered roller thrust bearings configured to allow the first wheel assembly to rotate independently of the solid axle and the second wheel assembly about the rotational axis when the torque exceeds the preset value,
wherein the tapered roller thrust bearings of the inner and outer rings are configured to not rotate about the rotational axis when the torque between the annular plate element and the torque limiter is below the preset value.

8. The dual wheel swivel caster of claim 7, wherein the first wheel assembly further comprises:
an annular bracket configured to rotate around the solid axle using both the inner and outer rings of tapered roller thrust bearings when the torque between the annular plate element and the torque limiter exceeds the preset value;
a first wheel rim rotatably coupled with the annular bracket; and
a first wheel rotatably coupled with the first wheel rim and configured to move along a ground surface.

9. The dual wheel swivel caster of claim 6, wherein the second wheel assembly further comprises:
a second annular wheel hub rotatably coupled with the solid axle;
a second wheel rim rotatably coupled with the second annular wheel hub; and
a second wheel rotatably coupled with the second wheel rim and configured to move along a ground surface.

10. The dual wheel swivel caster of claim 1, wherein the solid axle, integrally formed as a unitary piece, extends between the first and second wheel assemblies.

11. A transport vehicle configured to move along a ground surface and including at least one dual wheel swivel caster, the at one least dual wheel swivel caster comprising:
a swivel assembly including a swivel plate configured to be mounted to a vehicle;
a horn extending from the swivel assembly;
a rig hub rotatably coupled with the horn, the rig hub including a cavity extending therethrough;
a solid axle extending through the cavity and including first and second end portions;
at least one ring of roller bearings disposed within the cavity, the at least one ring of roller bearings configured to allow the solid axle to rotate relative to the rig hub about a rotational axis;
a first wheel assembly having a first wheel axis, the first wheel assembly including an annular plate element that is parallel to and offset from the first wheel axis;
a second wheel assembly rotatably coupled with the solid axle and configured to rotate about the rotational axis;
a torque limiter configured to rotatably couple the first and second wheel assemblies with the solid axle when the torque between the annular plate element and the torque limiter is below a preset value, wherein the torque limiter is configured to rotatably decouple the first wheel assembly from the solid axle and the second wheel assembly when the torque exceeds the preset value; and
at least one ring of bearings disposed adjacent a first end portion of the solid axle, the at least one ring of bearings configured to allow the first wheel assembly to rotate independently of the solid axle and the second wheel assembly about the rotational axis when the torque exceeds the preset value.

12. The transport vehicle of claim 11,
wherein the annular plate element includes first and second sides, and wherein the torque limiter further comprises:
a first annular friction disc disposed adjacent to and parallel to the first side the annular plate element;
a first annular pressure plate configured to support the first annular friction disc;
an annular disc spring; and an annular spring retainer configured to secure the annular disc spring, wherein the preset value is at least a function of a spring force of the annular disc spring against the first annular pressure plate and a frictional force between the first annular friction disc the first side the annular plate element.

13. The transport vehicle of claim 12, wherein the torque limiter further comprises:
a second annular friction disc disposed adjacent to and parallel to the second side of the annular plate element;
a second annular pressure plate configured to support the second annular friction disc,
wherein the preset value is at least a function of the spring force of the annular disc spring against the first annular pressure plate and a first frictional force between the first annular friction disc against the first side of the annular plate element and a second frictional force between the second annular friction disc against the second side of the annular plate element.

14. The transport vehicle of claim 12, wherein the first wheel assembly further comprises a first annular wheel hub rotatably coupled with the solid axle, wherein the spring force imparted by the annular disc spring is selectively adjustable by adjusting a torque adjustability mechanism threadably coupled with the first annular wheel hub.

15. The transport vehicle of claim 11, wherein the at least one ring of bearings further comprise:
inner and outer rings of tapered roller thrust bearings configured to allow the first wheel assembly to rotate independently of the solid axle and the second wheel assembly about the rotational axis when the torque exceeds the preset value,
wherein the tapered roller thrust bearings of the inner and outer rings are configured to not rotate about the rotational axis when the torque between the annular plate element and the torque limiter is below the preset value.

16. The transport vehicle of claim 15, wherein the first wheel assembly further comprises:
an annular bracket configured to rotate around the solid axle using both the inner and outer rings of tapered roller thrust bearings when the torque between the annular plate element and the torque limiter exceeds the preset value;
a first wheel rim rotatably coupled with the annular bracket; and
a first wheel rotatably coupled with the first wheel rim and configured to move along a ground surface.

17. The transport vehicle of claim 16, wherein the second wheel assembly further comprises:
a second annular wheel hub rotatably coupled with the solid axle;
a second wheel rim rotatably coupled with the second annular wheel hub; and
a second wheel rotatably coupled with the second wheel rim and configured to move along a ground surface.

18. The transport vehicle of claim 11, wherein the solid axle, integrally formed as a unitary piece, extends between the first and second wheel assemblies.

19. A method of preventing a dual wheel swivel caster from scrubbing a ground surface, the dual wheel swivel caster including a swivel assembly including a swivel plate configured to be mounted to a vehicle, a horn extending from the swivel assembly, a rig hub rotatably coupled with the horn, the rig hub including a cavity extending therethrough, a solid axle extending through the cavity and including first and second end portions, at least one ring of roller bearings disposed within the cavity, the at least one ring of roller bearings configured to allow the solid axle to rotate relative to the rig hub about a rotational axis, a first wheel assembly having a first wheel axis, the first wheel assembly including an annular plate element that is parallel to and offset from the first wheel axis, and a second wheel assembly rotatably coupled with the solid axle and configured to rotate about the rotational axis, the method comprising:
rotatably coupling the first and second wheel assemblies with the solid axle when the torque between the annular plate element and a torque limiter is below a preset value;
subsequently rotatably decoupling the first wheel assembly from the solid axle and the second wheel assembly when the torque exceeds the preset value, wherein at least one ring of bearings disposed adjacent a first end portion of the solid axle allow the first wheel assembly to rotate independently of the solid axle and the second wheel assembly about the rotational axis; and
subsequently rotatably coupling the first and second wheel assemblies with the solid axle when the torque between the annular plate element and the torque limiter is below the preset value using the torque limiter.

* * * * *

UNITED STATES PATENT AND TRADEMARK OFFICE
CERTIFICATE OF CORRECTION

PATENT NO. : 10,259,263 B2
APPLICATION NO. : 15/699280
DATED : April 16, 2019
INVENTOR(S) : Patrick L. McCartney It is certified that error appears in the above-identified patent and that said Letters Patent is hereby corrected as shown below:

In the Specification

Column 1, Lines 5-6, read, "The present invention relates generally to casters, and more particularly, to dual..." and should read -- "The present invention relates generally to casters and, more particularly, to dual..." --

Column 3, Line 5, reads, "...basic understanding of certain aspects the invention..." and should read -- "...basic understanding of certain aspects of the invention" --

Column 3, Line 32, reads, "...wheel swivel caster FIG. 4." and should read -- "...wheel swivel caster of FIG. 4." --

In the Claims

Column 9, Lines 11-12, Claim 2, read, "...a first annular friction disc disposed adjacent to and parallel to the first side the annular plate element;" and should read -- "...a first annular friction disc disposed adjacent to and parallel to the first side of the annular plate element;" --

Column 9, Lines 18-21, Claim 2, read, "...wherein the preset value is at least a function of a spring force of the annular disc spring against the first annular pressure plate and a frictional force between the first annular friction disc the first side the annular plate element." and should read -- "...wherein the preset value is at least a function of a spring force of the annular disc spring against the first annular pressure plate and a frictional force between the first annular friction disc and the first side of the annular plate element." --

Column 9, Lines 58-59, Claim 7, read, "The dual wheel swivel caster of claim 1, wherein the at least one ring of bearings further comprise:" and should read -- "The dual wheel swivel caster of claim 1, wherein the at least one ring of bearings further comprises:" --

Signed and Sealed this
Thirtieth Day of June, 2020

Andrei Iancu
*Director of the United States Patent and Trademark Office*

CERTIFICATE OF CORRECTION (continued)
U.S. Pat. No. 10,259,263 B2

Column 10, Line 28, Claim 11, reads, "...the at one least dual wheel swivel caster comprising:" and should read -- "...the at least one dual wheel swivel caster comprising:" --

Column 10, Lines 63-64, Claim 12, read, "...parallel to the first side the annular plate element;" and should read -- "...parallel to the first side of the annular plate element;" --

Column 11, Lines 3-6, Claim 12, read, "...wherein the preset value is at least a function of a spring force of the annular disc spring against the first annular pressure plate and a frictional force between the first annular friction disc the first side the annular plate element." and should read -- "...wherein the preset value is at least a function of a spring force of the annular disc spring against the first annular pressure plate and a frictional force between the first annular friction disc and the first side of the annular plate element." --

Column 11, Lines 27-28, Claim 15, read, "The transport vehicle of claim 11, wherein the at least one ring of bearings further comprise:" and should read -- "The transport vehicle of claim 11, wherein the at least one ring of bearings further comprises:" --

Column 12, Lines 38-39, Claim 19, read, "...least one ring of bearings disposed adjacent a first end portion of the solid axle allow the first wheel assembly..." and should read -- "...least one ring of bearings disposed adjacent a first end portion of the solid axle allows the first wheel assembly..." --